July 4, 1939. E. M. PFAUSER 2,164,621
AUTOMOBILE JACK
Filed Aug. 19, 1935 2 Sheets-Sheet 1
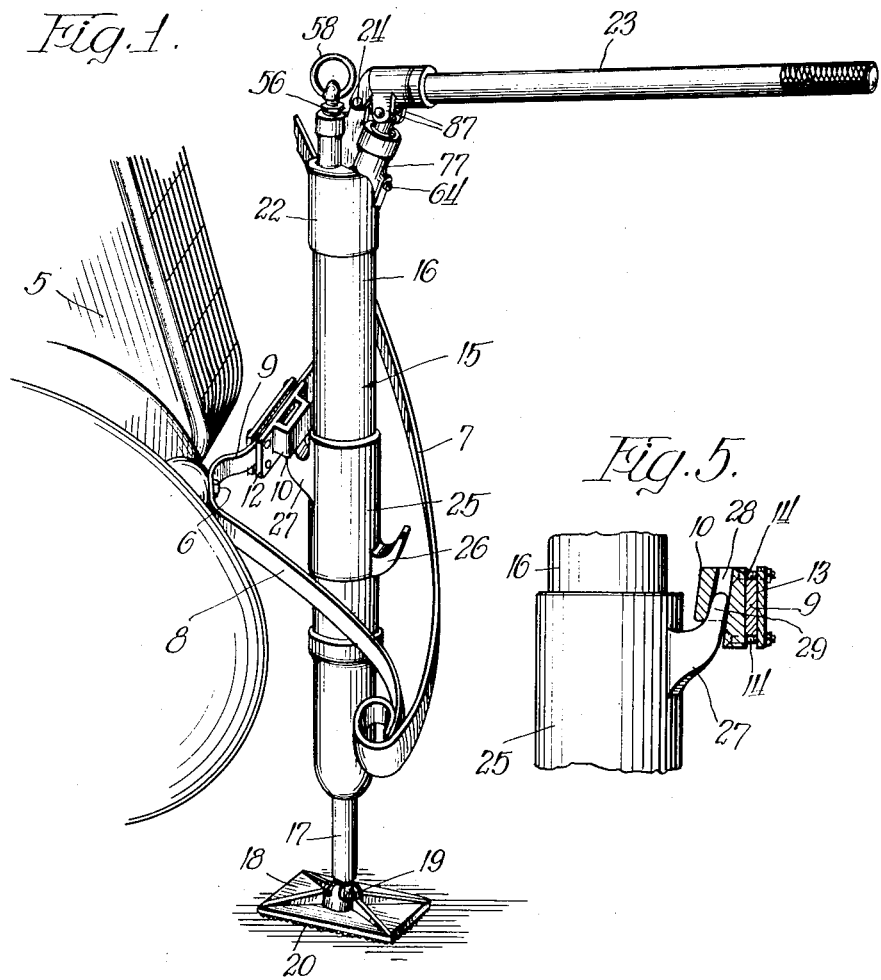

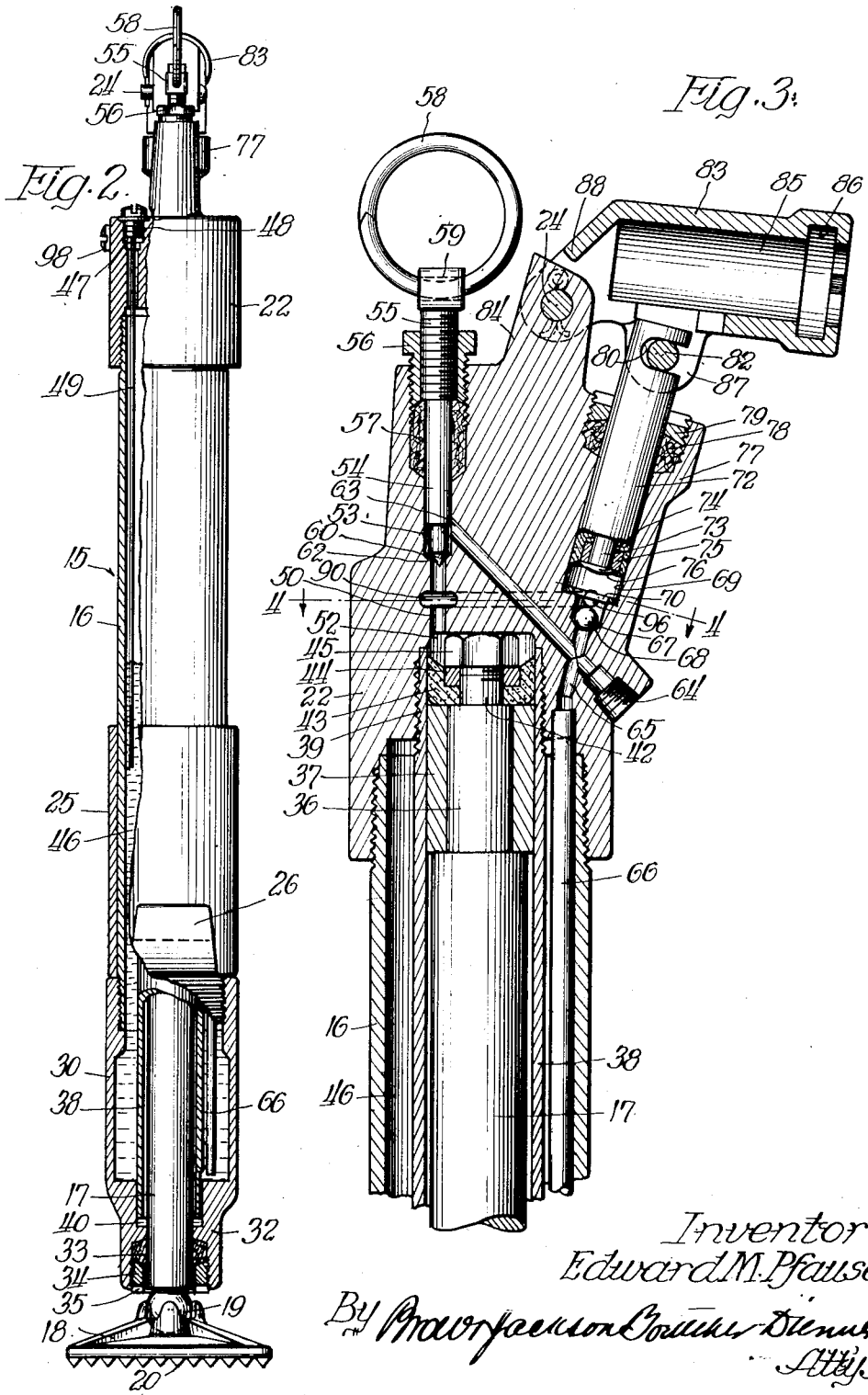

Patented July 4, 1939

2,164,621

UNITED STATES PATENT OFFICE 2,164,621

AUTOMOBILE JACK

Edward M. Pfauser, Elm Grove, Wis., assignor to Blackhawk Mfg. Co., Milwaukee, Wis., a corporation of Wisconsin Application August 19, 1935, Serial No. 36,765

9 Claims. (Cl. 254—93)

This invention relates to automobile jacks, and is more particularly directed to such jacks for engaging a desired portion of the bumper of a vehicle to facilitate raising the same without necessitating placing the jack in a position underneath any portion of the body or chassis of the vehicle.

With the advent of streamlined automobiles in which the body and fenders of the car overhang the chassis thereof to a considerable extent, difficulty has arisen with the use of the ordinary type of jack which must be placed under the chassis or axis of such a vehicle. The inaccessibility of such positioning of the jack, as well as the fact that the operator is liable to soil his clothing in attempting to place the jack in such position, has destroyed to a large extent the utility of the ordinary type of jack.

The present invention is primarily concerned with a jack adapted to be rigidly united with a portion of the bumper or other projecting part of the vehicle, to form a more or less integral extension of the vehicle adapted to engage the ground or road surface for lifting the car.

In its preferred embodiment, the present invention comprises a hydraulic bumper jack having means for engaging the bumper of the vehicle to impart a lifting force to the vehicle at the portion engaged, with means for hydraulically jacking the vehicle upwardly at this point to facilitate changing of tires, repairs or the like.

One object of the present invention is to provide means which may be permanently secured to a preselected portion of the bumper or the like, forming a socket for receiving and securely engaging the hook or lifting lug of the jack, whereby the jack is rigidly engaged with the bumper to prevent relative movement therebetween, thus eliminating any tendency of the vehicle to slip sidewise off of the jack or endwise. This provides a connection which in effect causes the jack to become a substantially integral part of the vehicle, whereby positive and effective lifting of the vehicle is attained without danger to the occupant or undesired movement of the car.

Another object of the present invention is to provide a jack having means whereby it is possible at all times to engage the bumper bar at such a height as to conserve to a great extent the actual hydraulic lift necessary for lifting purposes.

Still another object of the present invention is to provide a jack of this type having a quick lift action, whereby the jack can be engaged with the bumper and extended to approximate position for initial lifting effort without any expenditure of hydraulic lifting force.

Another advantage of the present invention resides in the provision of a rotatably mounted lifting member, so that the lifting means can be employed in any angular position of the jack.

Still another advantage of my invention resides in a jack construction in which the operating mechanism therefor is disposed at the upper end of the jack, above the bumper of the vehicle, where it is convenient and accessible for maximum effective application of force by the operator.

A further feature of the present invention resides in the provision of a base or supporting plate for the jack which is universally mounted for movement at the lower end of the jack, whereby inequalities in the road surface are accommodated, and the jack proper is free to rotate about the base plate in accordance with the angularity imposed by the raising of the vehicle.

The present invention also provides a jack of this type which is of such shape and size as to be readily carried within the vehicle, is relatively light in weight, and is simple and positive in operaton.

Other objects and advantages of the present invention will appear more fully from the following detailed description, which taken in connection with the accompanying drawings, will disclose to those skilled in the art the particular construction and operation of a preferred form of the present invention.

In the drawings:

Figure 1 is a perspective view showing the application of the jack to the bumper bar of a vehicle;

Figure 2 is a front elevational view of the jack, with a portion thereof broken away to show the interior construction thereof;

Figure 3 is a detail vertical sectional view of the upper portion of the jack and the operating means therefor;

Figure 4 is a sectional view through the head portion of the jack, taken susbtantially on line 4—4 of Figure 3; and Figure 5 is a diagrammatic view illustrating the manner in which the lifting lug of the jack engages the brackets carried by the bumper bar.

Referring now in detail to the drawings, in Figure 1 I have shown an automotive vehicle indicated generally at 5, having the bumper supporting member to which the bumper is clamped, as indicated at 6. The bumper proper is shown at 7, having the supporting brackets or bracing bars 8 and 9.

The bumper bar or supporting member 9 is provided, adjacent the support 6 of the bumper, with a clamping bracket 10 indicated in more detail in Figure 5, comprising an intermediate socket portion having oppositely extending shoulders 12 projecting laterally thereof, and having a second bracket plate 13 mounted on the opposite side of the bar 9 and providing for clamping of the bar therebetween by means of the bolt members 14 extending through the shoulders 12 of the bracket 10 and across the upper and lower edges of the bar 9 through the plate 13, the bolts 14 being provided with suitable nuts for tightening the bracket in position on the bumper bar 9. It is obvious that any desired portion of the bumper structure may be employed for receiving this bracket.

Each of the corresponding bumper bars on the vehicle may be provided with such clamping brackets, if desired, so that the brackets will be maintained in more or less permanent position on the vehicle, and the jack may be quickly engaged with or detached from any desired one of these brackets.

The jack is indicated in its entirety at 15, and comprises a cylinder 16, an extending plunger member 17, and a base or supporting plate 18 having universal engagement with the rounded end 19 of the plunger 17, the lower surface of the base plate 18 being serrated, as indicated at 20, to provide for positive gripping engagement with the road surface or similar supporting surface upon which the jack is supported. The upper end of the cylinder 16 is provided with a head portion 22, which carries the operating mechanism for the bumper jack, including the operating rod 23 which is adapted to have oscillating movement about the pivot 24 for jacking the plunger 17 outwardly of the lower end of the jack 15 to provide for raising of the vehicle.

About the lower end of the cylinder 16 there is provided a sleeve or collar member 25 freely rotatable with respect to the cylinder, having oppositely extending lug members 26 and 27 disposed at different positions with respect to the longitudinal axis of the sleeve. As shown in detail in Figure 5, either of the lugs 26 and 27 is adapted to have interlocking engagement within the socket opening 28 of the bracket 10, the lugs being provided with a substantially tapered vertically extending portion 29 having tight wedging engagement within a substantial portion of the opening 28, whereby the lug 27 is rigidly secured within this opening to hold the jack 15 substantially rigid with the bracket 10, whereby the jack forms a substantially integral part of the bracket 12, so that sidewise slipping of the vehicle or movement of the bumper bar relative to the jack is eliminated.

Considering now in detail the construction of the jack 15, the cylinder 16 is provided with threaded portions at its opposite ends, as shown in Figure 2, which portions are threaded into the head 22, and the base portion 30 of the jack. The base portion 30 is provided with a reduced end 32, which is recessed axially to receive the packing 33 held in position by the packing gland nut 34, which is provided with a suitable kerf 35 or the like for threading the same into the recess to compress the packing 33 about the lateral surface of the plunger 17. At its upper end, the plunger 17 is provided with an axially extending reduced portion 36, which is adapted to receive the cylindrical plunger disk 37, this plunger disk forming a guide for guiding the movement of the plunger axially of the cylindrical enclosing member 38 which is threaded at its upper end to a recessed portion of the head 22, as indicated at 39, and at its lower end extends into engagement within a recess 40 formed internally of the base member 30 coaxially of the opening through which the plunger 17 extends.

The upper end of the reduced portion 36 is provided with a threaded stud 42, about which is secured the plunger cup 43, formed of leather or other suitable or well known material, the cup 43 being compressed into position upon the disk 37 and the upper end of the reduced portion 36 of the plunger by means of the spreader ring 44. The ring 44 is compressed onto the plunger cup by means of the cup nut 45 threaded onto the end of the stud 42, whereby the plunger cup 43 is moved into tight sealing engagement with the internal wall of the cylindrical sleeve 38.

The sleeve 38, together with the inner surface of the cylindrical member 16 and the interior of the base portion 30 of the jack, provides a reservoir 46 containing the oil or other liquid employed for producing displacement of the plunger.

The head 22 of the jack is provided with a filler opening 47, through which the oil or other liquid may be introduced into the reservoir 46, the filler opening 47 being preferably closed by a filler plug 48 threading thereinto, the plug 48 carrying a suitable inwardly extending rod 49 which serves as a gauge for indicating the level of liquid within the reservoir 46, whereby the amount of liquid in the reservoir may be accurately determined.

Considering now in detail Figures 3 and 4, which specifically disclose the formation of the head end of the jack, the casting 22 which forms the end of the jack is provided with a longitudinally extending passageway 50, which passageway communicates with an enlarged recess 52 forming the opening through which liquid under pressure is introduced against the top of the plunger 17, to move the plunger axially outwardly through the base member 30. The passageway 50 is provided with a counterbored portion 53, adapted to receive the spindle 54 of a release valve member 55 threading into a suitable bushing 56, which bushing also serves as a gland nut for compressing packing 57 against the lateral surface of the spindle 54 to prevent leakage of oil therepast outwardly of the head 22. The release member 55 is provided at its upper end with a ring 58 mounted in the head end 59 thereof, whereby the jack may be hung in position when not in use, or may be readily carried about. At its lower end, the spindle 54 is provided with a reduced portion having a tapered valve seat 60 formed thereon, the valve portion 60 having seating engagement with a valve seat 62 formed between the passageway 50 and the counterbored portion 53 thereof, whereby upon threading of the member 55 inwardly of the bushing 56, the lower end of the spindle portion 54 closes off the passageway 50 against passage of fluid thereinto from the passageway 63.

The passageway 63 extends angularly upwardly through the head 22 of the jack, and at its lower end is closed by the threaded plug 64. Intermediate its ends, the passageway 63 has a connection with a cross passageway 65 extending downwardly of the head 22 into the tubular suction pipe 66, which extends downwardly through the reservoir 46 to the lower end of the jack, as shown in Figure 2.

At the upper end of the passageway 65, there is provided a ball check valve 67, having seating engagement upon a valve seat 68, formed in the counterbored portion of the passageway 65. The ball check valve 67 is retained in position by means of the retaining ring 70 press fitted into the lower end of a cylindrical passageway 69 forming a pressure cylinder in which the plunger 72 reciprocates for producing the hydraulic pressure necessary to operate the jack.

The plunger 72, at its inwardly extending edge, is provided with a reduced portion 73, which is adapted to receive the plunger cup 74, which is compressed into position against the lateral surface of the cylinder 70 by means of the spreader ring 74 and the spun over end 76 of the plunger.

The opposite end of the plunger 72 extends outwardly of the head 22, through a reduced outwardly extending boss portion formed at the upper end of the head. Suitable sealing means for the outer extending portion of the plunger 72 is provided by the packing 78 and the packing gland nut 79, tightly threaded into an enlarged recess in the boss 77, whereby the packing is compressed into sealing engagement with the lateral surface of the plunger 72.

The outer end of the plunger 72 is provided with a normally extending slotted portion 80, which is adapted to receive the pin 82 carried by the rocker arm 83, which arm is pivotally mounted upon an extension 84 of the head 22 by means of the pivot pin 24. The rocker arm 83 is provided with a cylindrical passage 85, adapted to receive the operating lever 23, which is moved into the passage 85 and may be locked in the annular groove 86 therein in any suitable manner to prevent its relative displacement during jacking of the member. The pivot pin 82 which is received in the fork 80 of the plunger 72 is carried between oppositely extending ears 87 formed integral with the rocker beam 83. A suitable downwardly extending central web 88 is provided at the pivoted end of the arm 83, which is adapted to have abutting engagement with the upper surface of the extension 84 to limit counterclockwise movement of the beam 83 about the pivot 24, thereby preventing withdrawal of the plunger 72 outwardly of the cylinder 70.

The passageway 50 is provided, intermediate its ends, with an opening 90 communicating with a diagonally extending passageway 92 passing substantially horizontally through the head 22 of the jack, and communicating, at its opposite end, with a recessed chamber 93 formed in the extension 94 of the head, the chamber 93 communicating through the passageway 95 with the lower end of the cylinder 70, there being a suitable ball check valve 96 interposed in this passageway and normally pressed into position to close the passageway by means of the spring 97 received within the recessed portion of a closure plug screw 98.

In the operation of the jack, the jack is first placed in vertical position with the supporting plate 18 disposed below the bumper clamp or bracket 10. The spindle member 55 is rotated to open the passage between the passageway 63 and 50, and by gripping the ring 58, the jack may then be pulled, the operator placing one foot upon the plate 18, to produce extension of the plunger 17, at the same time creating a suction in the upper end of the cylindrical member 38 above the head end of the plunger 17 whereby oil is drawn from the reservoir 46 through the suction pipe 66, the passageway 65, the passageway 63, and the counterbored portion 53 past the valve seat 62 and through the passageway 50 into the end of the plunger. The body of the jack, with the rotatable sleeve 25, can thus be moved upwardly until one of the lugs 26 or 27 is engaged within the socket 28 in the clamping bracket 10. After the lug has been securely fixed in position in this socket in relatively tight rigid position, the spindle 55 is threaded downwardly to close off communication between the passageways 63 and 50.

The operating handle 23 is then inserted into the rocker beam 83, and by reciprocation of the beam 83 about its pivot 84, the plunger 72 is moved inwardly and outwardly of the plunger cylinder 70, upon its upward movement creating a suction in the cylinder 70 whereby oil is drawn from the reservoir 46 through the pipe 66 and past the ball check valve 67 into the lower end of the cylinder 70. Upon the downward stroke of the plunger, this oil is moved under pressure against the ball check valve 96, displacing this check valve against the pressure of spring 97, and resulting in flow of oil under pressure through the passageway 95 from the lower end of the cylinder 70 through the passageway 92 and to the passageway 50, where the oil is forced downwardly against the end of the plunger 17 to move the same outwardly of the cylindrical sleeve 38.

Alternate reciprocations of the plunger 72 thereby produce increased liquid pressure against the plunger, resulting in displacement of the plunger axially outwardly of the base portion 30 of the jack, resulting in producing a reacting upward thrust at the lug which is engaged in the bumper bracket, thereby wedging the lug tighter in the bumper bracket, due to the load now imposed on the jack, and jacking the car upwardly.

When the car has reached its full upward position, it will remain in such a position, due to the fact that the oil pressure is exerted against the back side of the ball check valve 96, forcing this valve onto its seat to close its passageway 95 leading back into the reservoir 46 to the passageway 65 and the suction pipe 66. Thus the jack will remain in any desired position to hold the vehicle fixed in position during repair or inspection thereof. When it is desired to lower the vehicle, the spindle 55 is again rotated, backing off the valve member 60 from its seat 62, and allowing the discharge of the fluid under pressure from the upper end of the cylinder 38 outwardly through the passageway 50 and passageway 63 back into the suction pipe 66 and thence to the reservoir 46. This results in displacement of oil above the plunger 17, and due to the weight of the vehicle, the plunger moves back inwardly of the jack body, thereby lowering the vehicle to the ground. The rate at which the vehicle is lowered can be controlled accurately by the position of the spindle 55 outwardly from the seat 62, so that the car may be lowered relatively slowly, or more rapidly, as the operator desires.

It will be obvious, from an examination of Figures 1 and 5, that the engagement of the lugs 26 or 27 within the socket 28 of the bumper bar bracket 10 results in producing a more or less integral extension of the bumper bar through the lug and the jack to the supporting plate 18, whereby no sidewise or endwise slipping of the car vehicle with respect to the jack is produced. This tight wedging engagement of the upwardly extending portions of the lugs 27 or 26 within the sockets of the bumper bracket therefore provides a rigid connection assuring positive and safe operation of the jack in moving the desired portion of the vehicle upwardly to a height such that easy access to the tires or other under-portions of the vehicle is secured.

It will be apparent that by the provision of the quick lift means which we have provided the jack may be quickly moved into position with the lug engaging in the bumper bracket before any actual hydraulic jacking is necessary, which expedites the rate at which the jack may be placed in position and the vehicle lifted.

Also, the provision of the universal mounting between the supporting base plate and the head end of the plunger 17 provides for the jack assuming an angularity corresponding to the degree of lift effected thereby, whereby the rigid connection between the lugs on the sleeve 25 and the bumper bracket members will be maintained to hold the vehicle tightly against relative displacement with respect to the jack.

Also, by the provision of the rocker beam 83 at the upper end of the jack, the operating handle 23 is disposed in such position as to be readily accessible by the operator without bending, kneeling or the like, and thus provides for quick and easy operation of the jack without any danger of soiling of the clothes, or any unusual exertion on the part of the operator.

The provision of the sleeve 25 rotatable about the cylinder 16 is of advantage in that either lug 26 or 27 may therefore be engaged in the socket 28 of the bumper bracket, so that the amount of lift of the jack may be correspondingly controlled in accordance with the height at which the bumper bracket is originally disposed with respect to the supporting surface.

It is to be observed that the present jack applies its lifting force to what may be considered as an extension of the frame of the vehicle, the bumper being in effect an extension of the frame, for the purposes of the present invention. Since the frame and axle are connected by springs, a considerably greater lift is required of this type of jack to raise a wheel clear of the ground than would be the case if the jack were applied to the axle instead of the frame. However, I do not wish to limit the present invention to a specific point of application of the lifting force, except as the same is specifically recited in the claims.

I claim:

1. A bumper jack comprising a pair of concentric cylinders connected together at their lower ends and carrying a head at their upper ends, said cylinders defining a liquid reservoir, a plunger movable in the inner cylinder and extending outwardly thereof at the lower end of the reservoir, a pair of generally axially upwardly extending openings at the top of said head each communicating independently of the other with said reservoir and said plunger cylinder, pump means including a plunger disposed in one of said openings and movable downwardly therein to force fluid under pressure into said inner cylinder and extend said plunger, and a manual control valve disposed in the other opening, both said control valve and said pump plunger extending upwardly from the upper end of said head.

2. A bumper jack comprising a pair of concentric cylinders connected together at their lower ends and carrying a head at their upper ends, said cylinders defining a liquid reservoir, a plunger movable in the inner cylinder and extending outwardly thereof at the lower end of the reservoir, a pair of generally axially upwardly extending openings at the top of said head each communicating independently of the other with said reservoir and said plunger cylinder, pump means including a plunger disposed in one of said openings, a manual control valve disposed in the other opening, both said control valve and said pump plunger extending upwardly from the upper end of said head, handle means for said control valve and adapted to provide for manually lifting the jack reservoir upwardly of the jack plunger, and a pump handle pivoted to the upper end of said head and connected with said pump plunger, said pump handle extending generally laterally from the upper portion of the jack to facilitate operating the pump means when the jack is in position.

3. An automobile bumper jack of the hydraulic type comprising a plunger movable axially outwardly of the lower end of said jack under fluid pressure, an annular reservoir about said plunger, lug means carried by said reservoir adjacent the lower end of the jack for engaging the bumper of the automobile to be lifted, means extending upwardly from the upper end of the jack to provide for initially extending said plunger into position to engage said lug means with said bumper and locking said plunger against retraction, and means extending upwardly from the upper end of said jack above said lug means and in a direction away from the bumper engaged thereby to provide for forcing fluid under pressure against the upper end of said plunger to move the latter outwardly from its initially extended position to raise said bumper.

4. An automobile bumper jack of the hydraulic type, comprising a downwardly opening plunger cylinder and a surrounding fluid reservoir disposed about said cylinder, a plunger movable axially outwardly of the lower end of said reservoir under fluid pressure, lug means carried by said reservoir adjacent the lower end of the jack for engaging the bumper of the automobile to be lifted, and pump means extending upwardly from the upper end of the reservoir above said lug means and disposed above the bumper when engaged by said lug means, a suction conduit extending from said pump means through the reservoir to the lower end thereof, and valve means also disposed above the bumper when engaged by said lug means and operable in open position to allow flow of fluid between said reservoir and the inner end of said plunger upon manual outward movement of said plunger, said valve means in closed position locking said plunger against axial retracting movement.

5. An automobile bumper jack of the hydraulic type, comprising a downwardly opening plunger cylinder and a surrounding fluid reservoir disposed about said cylinder, a plunger movable axially outwardly of the lower end of said reservoir under fluid pressure, lug means carried by said reservoir adjacent the lower end thereof for engaging the bumper of an automobile to be lifted, and pump means extending upwardly and outwardly from the upper end of the reservoir above said lug means and including generally vertically swingable handle means movable downwardly to force liquid into said cylinder to force the plunger downwardly and outwardly therefrom.

6. A bumper jack comprising a plunger cylinder closed at its upper end and open at its lower end, a plunger disposed therein and extending downwardly therefrom at its lower end, pump means at the upper end of said cylinder for forcing liquid into the upper end thereof to extend the plunger downwardly and raise said cylinder, load engaging means on said cylinder, and handle means connected with said cylinder and pump means so that a downward force applied to the handle means forces liquid into said cylinder to raise the latter and its load and simultaneously therewith reacts against said cylinder to also raise the same.

7. A bumper jack comprising a plunger cylinder closed at its upper end and open at its lower end, a plunger disposed therein and extending downwardly therefrom at its lower end, pump means at the upper end of said cylinder for forcing liquid into the upper end thereof to extend the plunger downwardly and raise said cylinder, load engaging means on said cylinder, handle means connected with said cylinder and pump means so that a downward force applied to the handle means forces liquid into said cylinder to raise the latter and its load and simultaneously therewith reacts against said cylinder to also raise the same, there being a passage accommodating a flow of liquid out of said cylinder to provide for lowering said load and cylinder, a valve having screw-threaded engagement with the upper portion of the plunger cylinder for controlling said passage, and a valve handle for turning the valve and for exerting a force through its threaded connection with the pump cylinder for manually raising the latter independently of the pump means until said load engaging means on the cylinder engages a load.

8. A bumper jack comprising a pair of concentric cylinders connected together at their lower ends and carrying a head at their upper ends, said cylinders defining a liquid reservoir therebetween, a plunger movable in the inner cylinder and extending outwardly thereof at the lower end of the reservoir, a pair of generally axially upwardly extending openings at the top of said head each communicating independently of the other with said reservoir and said plunger cylinder, an upwardly extending bracket carried by said head between said openings, a pump plunger movable downwardly in one of said openings for forcing fluid into the inner cylinder to extend the plunger, a pump handle pivoted to said bracket and connected with said pump plunger so that a downward thrust on said handle forces said pump plunger inwardly, and a manual control valve disposed in the other opening in the head and extending upwardly and having at its upper end an operating handle adjacent the inner end of the pump handle.

9. A bumper jack comprising a plunger cylinder closed at its upper end and open at its lower end, a plunger disposed therein and extending downwardly therefrom at its lower end, pump means at the upper end of said cylinder for forcing liquid into the upper end thereof to extend the plunger downwardly and raise said cylinder, load engaging means on said cylinder, there being a passage accommodating a free flow of liquid into said cylinder to provide for manual extension of the jack, valve means controlling said passage and having an upwardly extending handle portion connected with the cylinder so that a pull on said handle portion when the valve is open will raise the cylinder, and a base on the lower end of said plunger extending laterally an amount sufficient to receive the foot of an operator so as to hold the plunger down when said valve is opened and an upward pull is exerted on said handle means to raise the cylinder into initial load engaging position.

EDWARD M. PFAUSER.